UNITED STATES PATENT OFFICE.

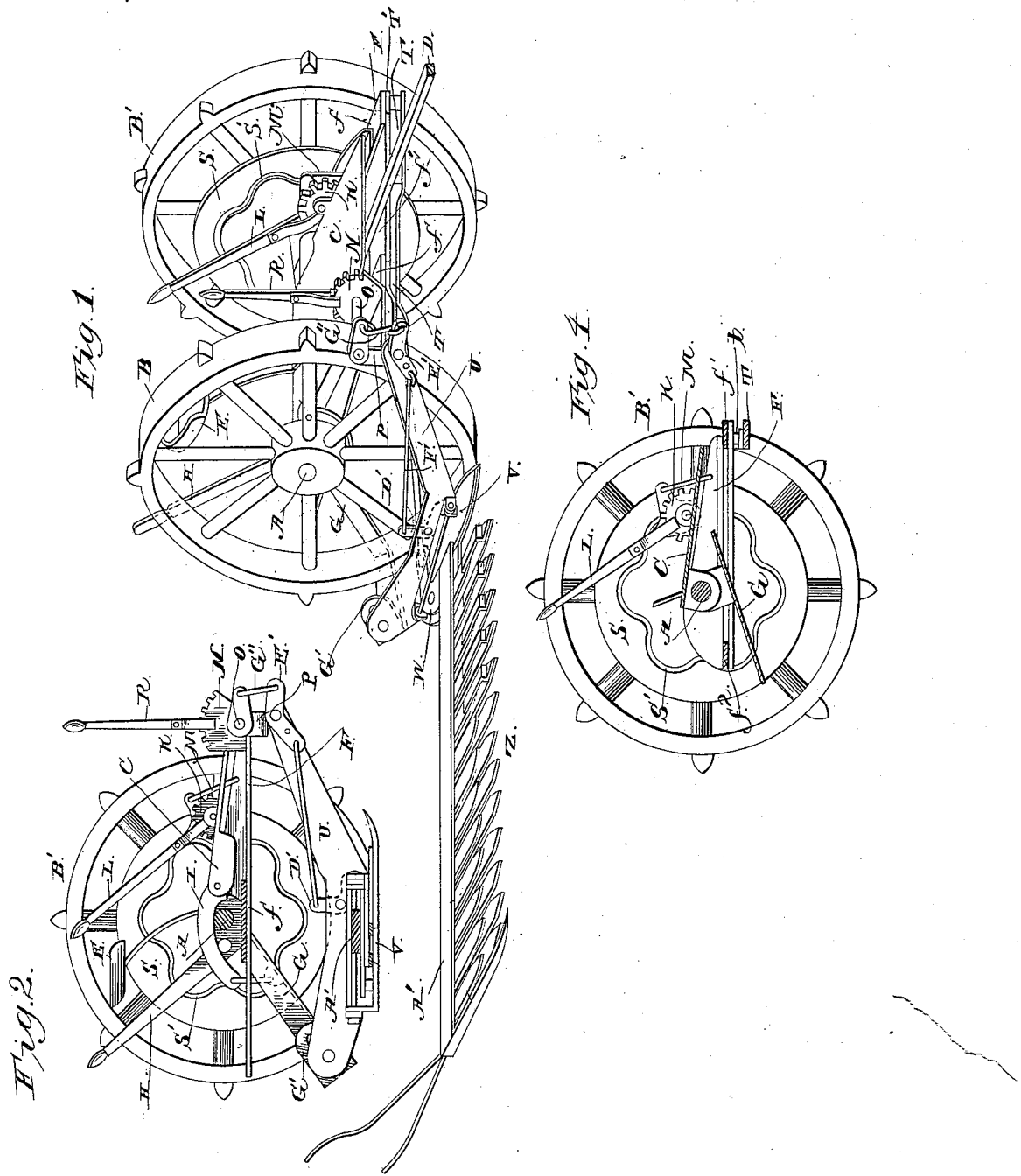

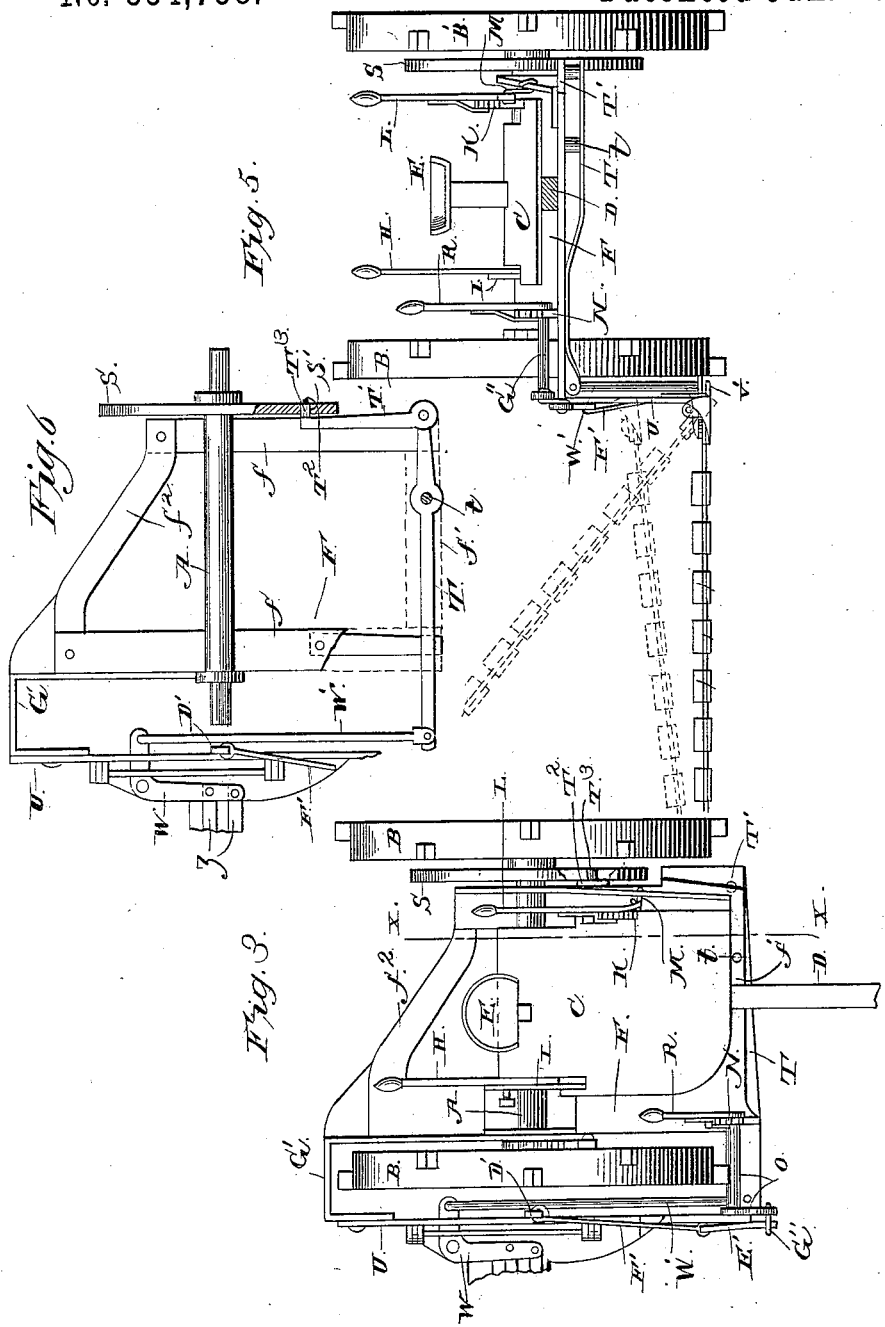

ELMER DICKINSON, OF BELAIR, MICHIGAN.

MOWER.

SPECIFICATION forming part of Letters Patent No. 334,758, dated January 26, 1886.

Application filed May 25, 1885. Serial No. 166,613. (No model.)

*To all whom it may concern:*

Be it known that I, ELMER DICKINSON, a citizen of the United States, residing at Belair, in the county of Antrim and State of Michigan, have invented a new and useful Improvement in Mowers, of which the following is a specification, reference being had to the accompanying drawings.

My invention relates to an improvement in mowing-machines; and it consists in the peculiar construction and combination of devices that will be more fully set forth, and particularly pointed out in the claims.

In the accompanying drawings, Figure 1 is a perspective view of a mowing-machine embodying my invention. Fig. 2 is a sectional side elevation of the same. Fig. 3 is a top plan view. Fig. 4 is a vertical section taken on the line $x$ $x$ of Fig. 3. Fig. 5 is a front elevation. Fig. 6 is a top plan view with parts removed and portions of frame F broken away to disclose the lever T and its connections.

A represents an axle, to which are secured the driving and supporting wheels B and B'. The platform C is hinged centrally on the axle, and is provided with a tongue, D, and a driver's seat, E.

F represents a frame that is composed of the side bars, $f$, the front connecting-bar, $f'$, and the rear oblique connecting-bar, $f^2$. This frame is hinged on the axle A on the outer sides of the platform. A hinged bracket, G, is secured on the axle, and extends rearwardly and downwardly therefrom. Near one end of the axle B is pivoted a cam-lever, H, which actuates the lever I, that is pivoted to the platform C and extends rearwardly therefrom. The free end of the lever I, is connected by the link with the hinged bracket G. On the side of the platform C opposite the lever H is fixed a segmental rack, K, to which is pivoted a bent lever, L. The lever L is provided with a spring-actuated bolt that engages with the rack-segment and secures the lever thereto in any desired position in the usual way. A link, M, connects the outer bent end of the lever L with the hinged frame F. To the front end of the frame F, on the right-hand side thereof, is secured a segmental rack, N. A crank-shaft, O, is journaled in this rack and in an upturned bracket or lug, P, that is secured to the frame F, and to the inner end of the crank-shaft is fixed a hand-lever, R, having a spring-actuated bolt that engages with the segmental rack N.

To the axle A, near the wheel B', is fixed a cam-wheel, S, having a curved slot or camway, S', which is shaped as shown in Fig. 4. A lever, T, is fulcrumed under the front side of the frame F, as at $t$, and has its short end connected to an arm, T', the rear end of which arm is provided with a projecting stud, $T^2$, having a friction-roller, $T^3$, that works in the curved camway S'. The motion imparted from the cam S as the machine is drawn along causes the lever T to oscillate, as will be very readily understood.

To the projecting right-hand corner of the frame F is pivoted an arm, U, the rear end of which is provided with a stud that works in a slotted bent arm, G', that is formed with or secured to the bracket G.

To the lower side of the arm U is hinged a finger-bar, V. To the inner end of this finger-bar is pivoted a bell-crank lever, W, which is connected by a rod, W', with the free end of the fulcrumed lever T.

Z represents the cutting apparatus, having the usual finger-bar and cutter-bar. On the upper side of the finger-bar is bolted a guard-plate, A', which guides the cutter-bar and keeps said cutter-bar in contact with the finger-bar.

A bell-crank lever, D', is fulcrumed to the arm U, and has its lower bent arm bearing on a stud, V', that projects inwardly from the hinged shoe of the finger-bar. A similar bell-crank lever, E', is fulcrumed on the spindle projecting from the frame F, to which the arm U is pivoted, and said bent lever E' is connected by a rod, F', with the bent lever D', and by a link, G', with the crank-shaft O. By this construction it will be readily understood that by moving the hand-lever R rearwardly the outer end of the cutting mechanism may be raised from the ground when it is necessary to do so in order to avoid a stump, stone, or other obstruction.

The function of the hinged bracket G, the lever I, and the connecting-link by which said lever is connected to the hinged bracket is to enable the inner end of the cutting mechanism to be raised from the ground in order to avoid an obstruction near the driving-wheel B without the necessity of raising the outer end of the cutting mechanism and without interfering with the operation thereof.

Having fully described my invention, what I claim as new is—

1. The combination of the axle, the driving and supporting wheels secured thereto, the frame F, the hinged bracket G, the arm U, pivoted to the frame F and secured in a slotted arm of the bracket G, the cutter hinged to the arm U, and the lever for raising or lowering the bracket G, substantially as described.

2. The combination of the axle, the driving and supporting wheels mounted thereon, the frame F, the hinged bracket G, the arm U, pivoted to the frame F and secured in a slotted arm of the bracket G, the cutter hinged to the arm and having the stud V', the lever D', fulcrumed to the arm U and bearing on stud V', a lever connected to the lever D' for raising the outer end of the cutter, and a lever for raising the bracket G, and thereby raising the inner end of the cutter, substantially as set forth.

3. The combination of the axle having the driving and supporting wheels, and the wheel S, having the curved slot or camway S', the frame F on the shaft, the fulcrumed lever T, having the arm T', working in slot S', the arm U, secured to the frame F, the cutter hinged to the arm U and having the actuating bent lever W, and the rod W', connecting the free ends of the levers T' and W, for actuating the cutters, substantially as described.

4. The combination of the axle having the driving and supporting wheels, and the wheel S, having the curved slot or camway S', the frame F on the shaft, the fulcrumed lever T, having the arm T', working in slot S', the arm U, secured to the frame F, the finger-bar hinged to the arm U, and the fulcrumed lever W, connected to the lever T and to the cutting apparatus, for actuating the latter, substantially as described.

In testimony that I claim the foregoing as my own I have hereto affixed my signature in presence of two witnesses.

ELMER DICKINSON.

Witnesses:
ELIZA A. HARRIMAN,
HENRY C. BEDELL.